June 10, 1952  S. FISHER  2,599,819
CENTER GAUGE
Filed March 28, 1950
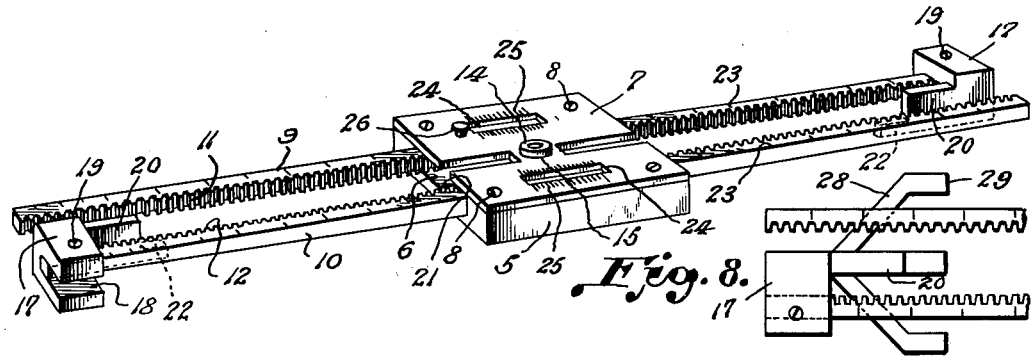
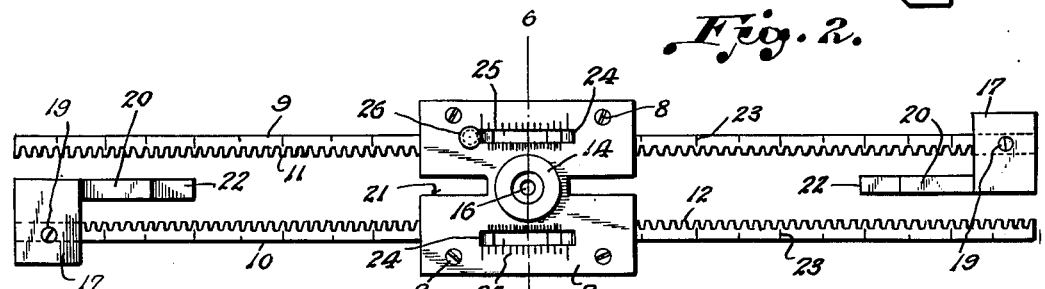
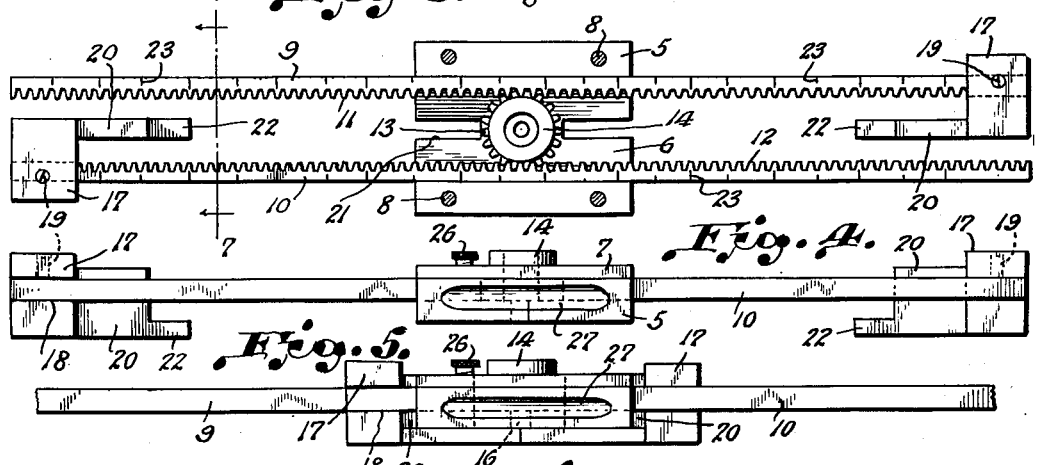
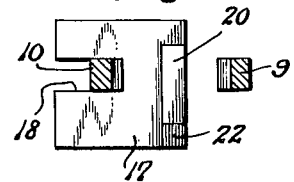
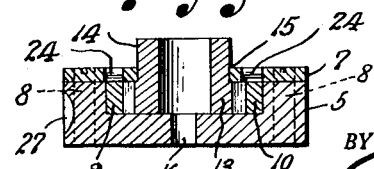
INVENTOR.
Stephen Fisher
BY
Ralph B Burch
ATTORNEY.

Patented June 10, 1952

2,599,819

UNITED STATES PATENT OFFICE 2,599,819

CENTER GAUGE

Stephen Fisher, Ecorse, Mich.

Application March 28, 1950, Serial No. 152,350

1 Claim. (Cl. 33—191)

This invention relates to improvements in center gages and more particularly to an instrument which will quickly and accurately locate the center of work.

A further object of the invention resides in providing an instrument having rack bars slidably mounted in a block for movement in opposite directions with work engaging members carried at opposite ends of the bars, the members each having flanges for interlocking engagement with slots in the block when the members are in collapsed position.

Another object of the invention resides in providing an instrument of the character described which is simple in construction, efficient in use and inexpensive to manufacture.

Other objects and advantages of the invention will be apparent during the course of the following description.

In the accompanying drawing forming a part of this specification and in which like numerals are employed to designate like parts throughout the same, Fig. 1 is a perspective view of the instrument, Fig. 2 is a top plan view of the same, Fig. 3 is a top plan view with the cover plate of the block removed, Fig. 4 is an edge view of the instrument, Fig. 5 is an enlarged edge view of the block showing the work engaging members in collapsed position, Fig. 6 is a cross section taken on line 6—6 of Fig. 2, and Fig. 7 is a cross section taken on line 7—7 of Fig. 3.

Fig. 8 is a fragmentary plan view showing a modified form of work engaging member.

Referring to the drawing wherein for the purpose of illustration a preferred embodiment of the invention is shown the numeral 5 denotes a flat block having a transverse recess 6 covered by plate 7 secured to the block by screw fasteners 8. A pair of rack bars 9 and 10 are disposed at opposite sides of the recess 6 in parallel spaced relation and are provided with teeth 11 and 12 on their confronting faces. A gear 13 is disposed intermediate the rack bars with its teeth in mesh with the teeth of the rack bars and has a hub 14 journaled in an opening 15 in the cover plate 7. The hub 14 is in axial alinement with an opening 16 in the block 5 which permits a trip hammer punch to be inserted and operated to punch a hole in the work when the instrument is employed as a center gage.

Attached to opposite ends of each rack bar is a work engaging block 17 having a slot 18 to receive the end of the rack bar. A set screw 19 secures the block in adjusted position on the rack bar. Extending from the inner face of the block 17 is a flange 20 adapted to enter a slot 21 formed in the block 5 when the blocks 17 are moved together and each flange has a reduced extended finger 22 which slides over the bottom of the block 5 and meet in covering relation to the opening 16. One face of the rack bars 9 and 10 is provided with graduations 23 which are viewed through slots 24 in the cover plate 7 and graduations 25 along the edges of slots 24 register with the graduations on the rack bars. A thumb screw 26 mounted in plate 7 adjacent the end of one of the slots 24 serves to secure the rack bars in their adjusted relation. Mounted in one edge of the block 5 is a spirit level 27.

In Fig. 8 a modified form of work engaging member 17 is shown having arms 28 extending from opposite sides of the flange 20 at a 45° angle with the terminals 29 of the arms bent to extend in parallel relation to the finger 22.

In operation, when one of the rack bars 9 and 10 is moved longitudinally the gear 13 is rotated and thereby moves the other rack bar in the opposite direction a corresponding distance. Thus, the work engaging blocks 17 are moved towards or from each other by longitudinal movement of the rack bars which move in unison. With the work engaging blocks adjusted to opposite sides of the work, the opening 16 will be directly in the center of the work and through use of a trip hammer punch operating through the hub 14 and opening 16 a hole may be punched in the work to mark the center. It is obvious that aside from being used as a center gage the instrument may be used as a divider, compass, level etc.

It is to be understood that the form of the invention herein shown and described is to be taken as a preferred example of the same and certain changes in the shape, size and arrangement of the parts may be made without departing from the spirit of the invention or scope of the subjoined claim.

Having thus described my invention, I claim:

An instrument of the character described comprising a flat rectangular body having a longitudinal groove in its upper face, said groove at each end having a central longitudinal slot, a cover plate for said body having a central opening and slots in each end in vertical alinement with the slots of said groove, a gear wheel disposed in the groove of said body having a hub journaled in the opening of said cover, said hub having a central bore in register with an opening in the center of said body adapted to receive a center punch, parallel rack bars slidably mounted in the groove of said body on opposite sides of said gear wheel and in mesh therewith, said rack bars extending beyond the ends of said groove and having graduations along their upper sides, a thumb screw mounted in said cover for engagement with one of said rack bars for securing the same in adjusted position, and work engaging members slidably mounted on opposite ends of said rack bars having flanges extending parallel to the rack bars towards said body in alinement with the longitudinal center of said groove adapted to enter the slots in the ends of said cover and groove when said members are moved towards said body, said flanges having longitudinal extending fingers in a plane below the bottom of said body adapted to meet and cover the opening in the center of said body.

STEPHEN FISHER.

REFERENCES CITED

The following references are of record in the file of this patent:

UNITED STATES PATENTS

| Number | Name | Date |
|---|---|---|
| 458,055 | Hunt et al. | Aug. 18, 1891 |
| 578,196 | Beck | Mar. 2, 1897 |
| 834,973 | Fisk | Nov. 6, 1906 |
| 956,116 | Lohman | Apr. 26, 1910 |
| 1,187,658 | Sauerhering | June 20, 1916 |
| 1,286,748 | Ozerowicz | Dec. 3, 1918 |
| 2,479,912 | Desy | Aug. 23, 1949 |